(12) United States Patent
Sawa

(10) Patent No.: US 11,780,063 B2
(45) Date of Patent: Oct. 10, 2023

(54) POWER TOOL TO TOOL BIT EXTENSION ADAPTER

(71) Applicant: MILWAUKEE ELECTRIC TOOL CORPORATION, Brookfield, WI (US)

(72) Inventor: Max R. Sawa, Palatine, IL (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 81 days.

(21) Appl. No.: 16/753,023

(22) PCT Filed: Oct. 9, 2018

(86) PCT No.: PCT/US2018/054919
§ 371 (c)(1),
(2) Date: Apr. 2, 2020

(87) PCT Pub. No.: WO2019/074871
PCT Pub. Date: Apr. 18, 2019

(65) Prior Publication Data
US 2020/0254596 A1  Aug. 13, 2020

Related U.S. Application Data

(60) Provisional application No. 62/570,297, filed on Oct. 10, 2017.

(51) Int. Cl.
*B25B 23/00* (2006.01)
(52) U.S. Cl.
CPC .................. *B25B 23/0035* (2013.01)
(58) Field of Classification Search
CPC ............ B25B 23/0021; B25B 23/0042; B25B 23/0035; B25G 1/04; B25G 1/043;
(Continued)

(56) References Cited

U.S. PATENT DOCUMENTS 3,922,011 A * 11/1975 Walters ................. F16L 37/088
285/902
4,131,165 A  12/1978 Wanner et al.
(Continued)

FOREIGN PATENT DOCUMENTS

DE  8902134  8/1989
EP  0304002  2/1989
(Continued)

OTHER PUBLICATIONS

Cambridge English Dictionary [online]. Definition of Engage, [retrieved on Dec. 29, 2022], Retrieved from the Internet: < https://dictionary.cambridge.org/us/dictionary/english/engage > (Year: 2022).*
(Continued)

*Primary Examiner* — Brian D Keller
*Assistant Examiner* — Robert C Moore
(74) *Attorney, Agent, or Firm* — Michael Best & Friedrich LLP

(57) ABSTRACT

An extension adapter includes a body having a bore. The bore is configured to receive a tool bit. The extension adapter includes a retaining member received within an aperture of the body and a biasing member coupled to the body. The biasing member includes a protrusion received within the aperture to bias the retaining member into a first position in which a portion of the retaining member extends into the bore. The extension adapter includes a collar moveable between an unlocked position and a locked position. The unlocked position is configured to allow the tool bit to be removed from the bore. While the collar is maintained in the locked position, the body is configured to slidably receive the tool bit such that the portion of the retaining member is received in a groove of the tool bit to secure the tool bit to the body.

8 Claims, 11 Drawing Sheets

(58) Field of Classification Search
CPC .... B23B 51/0473; B23B 51/126; F16L 37/22; F16L 37/23
USPC ....... 81/436–438, 177.85, 448, 177.1, 177.2; 285/276, 277, 316, 268, 121.4
See application file for complete search history.

(56) References Cited

U.S. PATENT DOCUMENTS

| | | | |
|---|---|---|---|
| 5,398,946 A | 3/1995 | Quiring | |
| D376,084 S | 12/1996 | Karvinen | |
| 5,615,587 A | 4/1997 | Foerster, Jr. | |
| 6,223,375 B1 | 5/2001 | Vaughn, Jr. | |
| 6,364,318 B1 | 4/2002 | Bedi et al. | |
| 6,511,268 B1 | 1/2003 | Vasudeva et al. | |
| 6,715,384 B1 | 4/2004 | Kozak | |
| D504,933 S | 5/2005 | Hopwood | |
| 6,920,810 B1 * | 7/2005 | Thompson | B25G 3/26 81/177.85 |
| 7,435,042 B2 | 10/2008 | White et al. | |
| 7,469,909 B2 | 12/2008 | Strauch et al. | |
| 7,669,860 B2 | 3/2010 | Chiang | |
| 7,922,180 B2 | 4/2011 | Meng | |
| D642,882 S | 8/2011 | Lane | |
| D659,730 S | 5/2012 | Cantion | |
| D673,193 S | 12/2012 | Dickrede | |
| 8,468,913 B1 | 6/2013 | Bond | |
| 8,505,418 B1 | 8/2013 | Chiang | |
| D705,282 S | 5/2014 | Jones, Jr. | |
| 8,733,216 B1 | 5/2014 | Cantion | |
| 8,770,898 B2 | 7/2014 | Nordlin | |
| 8,800,999 B2 * | 8/2014 | Puzio | B23B 31/107 279/75 |
| 8,864,144 B2 | 10/2014 | Hsu | |
| 9,089,901 B2 | 7/2015 | White et al. | |
| D736,053 S | 8/2015 | Zhang | |
| 9,463,559 B1 | 10/2016 | Chan | |
| D772,030 S | 11/2016 | Andersen | |
| 9,844,818 B2 | 12/2017 | White et al. | |
| D853,808 S | 7/2019 | Hyma et al. | |
| 2003/0140744 A1 | 7/2003 | Chen | |
| 2006/0228181 A1 | 10/2006 | Kozak | |
| 2006/0254394 A1 | 11/2006 | Cantlon et al. | |
| 2007/0187452 A1 | 8/2007 | Budzisz | |
| 2007/0214916 A1 * | 9/2007 | Lee | B25B 23/0021 81/177.85 |
| 2012/0025474 A1 | 2/2012 | Huang | |
| 2012/0301238 A1 | 11/2012 | Quinn et al. | |
| 2014/0097582 A1 | 4/2014 | Wang | |
| 2015/0102567 A1 | 4/2015 | Chan | |
| 2015/0217434 A1 * | 8/2015 | Funk | B23B 31/1071 279/82 |
| 2017/0165818 A1 | 6/2017 | Zimmermann et al. | |

FOREIGN PATENT DOCUMENTS

| | | | |
|---|---|---|---|
| EP | 0928668 | 7/1999 | |
| EP | 1245341 | 10/2002 | |
| EP | 1245341 A2 * | 10/2002 | ........... B25D 17/005 |
| EP | 1400655 | 3/2004 | |
| EP | 2517836 A2 | 10/2012 | |
| EP | 2689895 A1 | 1/2014 | |
| JP | 3143187 B2 | 3/2001 | |
| JP | 2014100774 A | 6/2014 | |
| JP | 3201562 U | 12/2015 | |

OTHER PUBLICATIONS

Relton Corporation, "SDS+ Extensions & Quik-Lok Adapters", <http://relton.com/quik-lok-adaptors/> website available as early as Jul. 19, 2016, 2 pages.
International Search Report and Written Opinion for Application No. PCT/US2018/054919 dated Jan. 11, 2019 (10 pages).
Partial Supplementary European Search Report for Application No. 18866042.7 dated Jun. 22, 2021 (10 pages).
Extended European Search Report for Application No. 18866042.7 dated Dec. 21, 2021 (12 pages).
English Translation of previously submitted reference EP 1245341 A2 (DreBo Werkzeugfabrik GmbH) published on Oct. 2, 2002, translation received on Mar. 28, 2023 (27 pages).

* cited by examiner

POWER TOOL TO TOOL BIT EXTENSION ADAPTER

CROSS-REFERENCE TO RELATED APPLICATIONS

This application is a national phase filing under 35 U.S.C. 371 of International Application No. PCT/US2018/054919 filed Oct. 9, 2018, which claims priority to U.S. Provisional Patent Application No. 62/570,297 filed Oct. 10, 2017, the contents of which are incorporated herein by reference.

FIELD OF THE DISCLOSURE

The present disclosure relates to extension adapters for tool bits, and more particularly to extension adapters that couple a tool bit to a power tool.

SUMMARY

The present disclosure provides, in one aspect, an extension adapter configured to couple a tool bit to a power tool. The power tool is configured to drive the extension adapter and the tool bit about a rotational axis. The extension adapter includes a body having a bore. The bore is configured to receive the tool bit. The extension adapter also includes a retaining member received within an aperture of the body and a biasing member surrounding a portion of the body. The biasing member includes a protrusion received within the aperture to bias the retaining member into a first position in which a portion of the retaining member extends into the bore. The extension adapter further includes a collar moveable between an unlocked position and a locked position. The unlocked position is configured to allow the tool bit to be removed from the bore. While the collar is maintained in the locked position, the body is configured to slidably receive the tool bit such that the portion of the retaining member is received in a groove of the tool bit to secure the tool bit to the body.

The present disclosure provides, in another aspect, an extension adapter configured to couple a tool bit to a power tool. The power tool is configured to drive the extension adapter and the tool bit about a rotational axis. The extension adapter includes a body having an inner surface defining a bore configured to receive the tool bit. The bore includes a first diameter. The extension adapter also includes a collar moveable between an unlocked position and a locked position. The unlocked position is configured to allow the tool bit to be removed from the bore. The locked position is configured to secure the tool bit to the body. The extension adapter includes a maximum outer diameter. A ratio of the maximum outer diameter of the extension adapter over the first diameter of the bore is equal to or less than 2.5.

The present disclosure provides, in yet another aspect, an extension adapter configured to couple a tool bit to a power tool. The power tool is configured to drive the extension adapter and the tool bit about a rotational axis. The extension adapter includes a body having a bore. The bore is configured to receive the tool bit. The extension adapter also includes a retaining member received within an aperture of the body. The retaining member includes a major dimension. The extension adapter further includes a collar moveable between an unlocked position and a locked position. The unlocked position is configured to allow the tool bit to be removed from the bore. The locked position is configured to secure the tool bit to the body. The extension adapter includes a maximum outer diameter. A ratio of the maximum outer diameter of the extension adapter over the major dimension of the retaining member is equal to or less than 4.7.

Other features and aspects of the disclosure will become apparent by consideration of the following detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
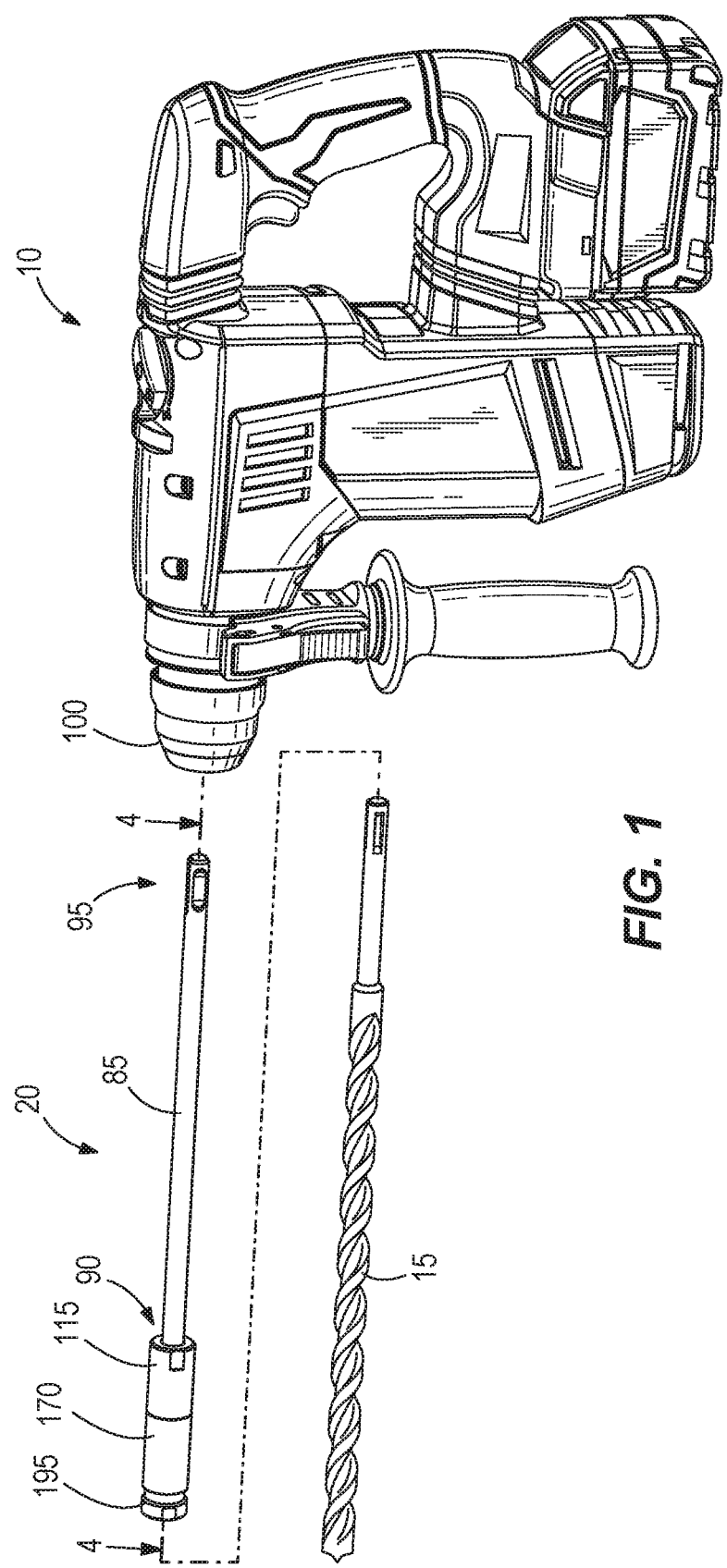
FIG. 1 is an exploded view of a power tool coupled to a tool bit by an extension adapter according to one embodiment.
Figure 2:
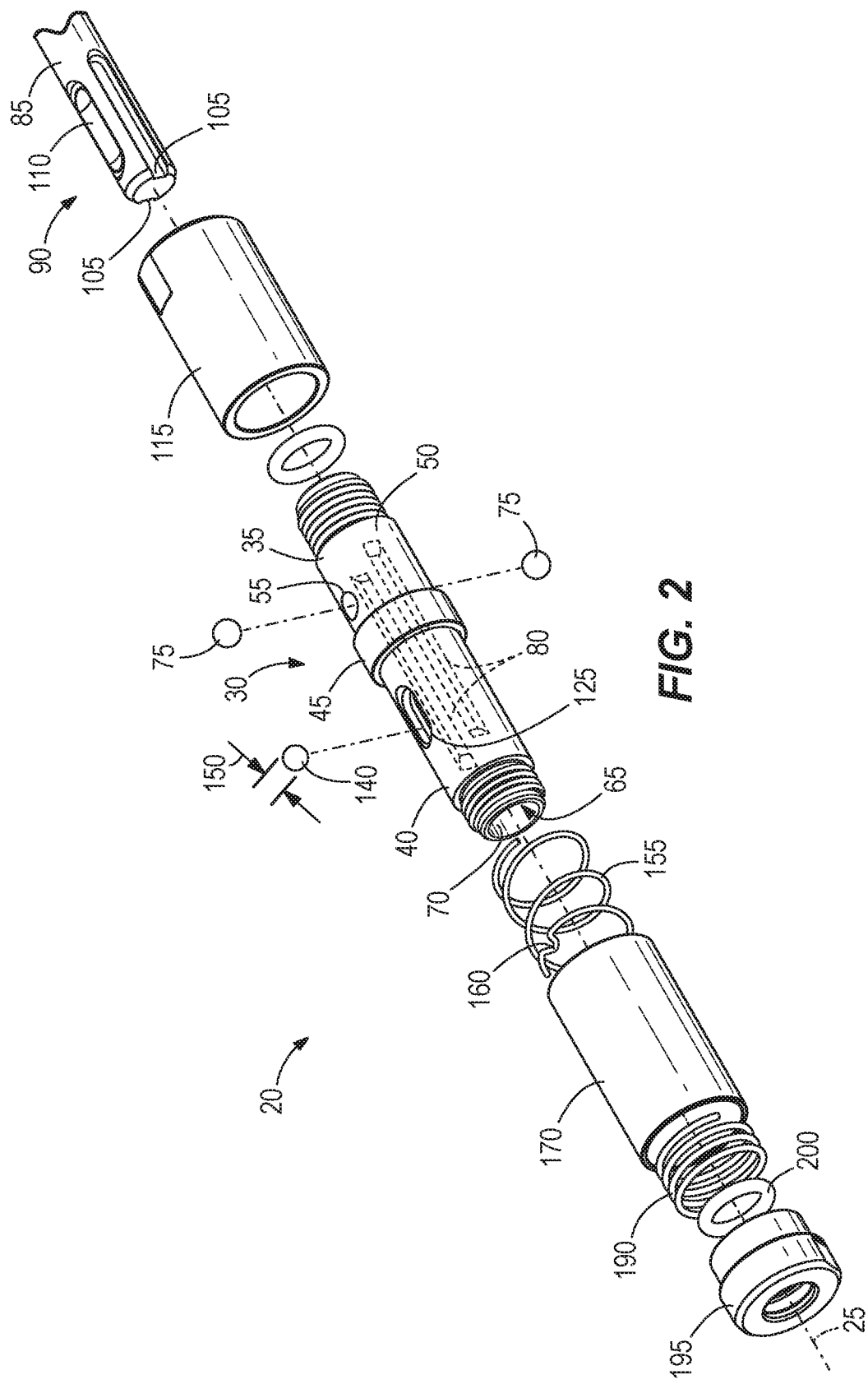
FIG. 2 is an exploded view of the extension adapter of FIG. 1.

FIG. 1 illustrates a power tool 10 selectively coupled to a tool bit 15 by an extension adapter 20. The power tool 10 is operable to rotate the adapter 20 and the tool bit 15 about a rotational axis 25 (FIG. 2). In the illustrated embodiment, the connection between the tool bit 15 and the adapter 20 and the connection between the adapter 20 and the power tool 10 is commonly referred to as a Special Direct System (SDS) plus connection. In other embodiments, the connection between the tool bit 15 and the adapter 20 and/or the connection between the adapter 20 and the power tool 10 can be a different type of SDS connection (e.g., SDS top connection, SDS max connection, etc.). In other embodiments, the tool bit 15 can be directly coupled to the power tool 10 by omitting the adapter 20.

Figure 4:
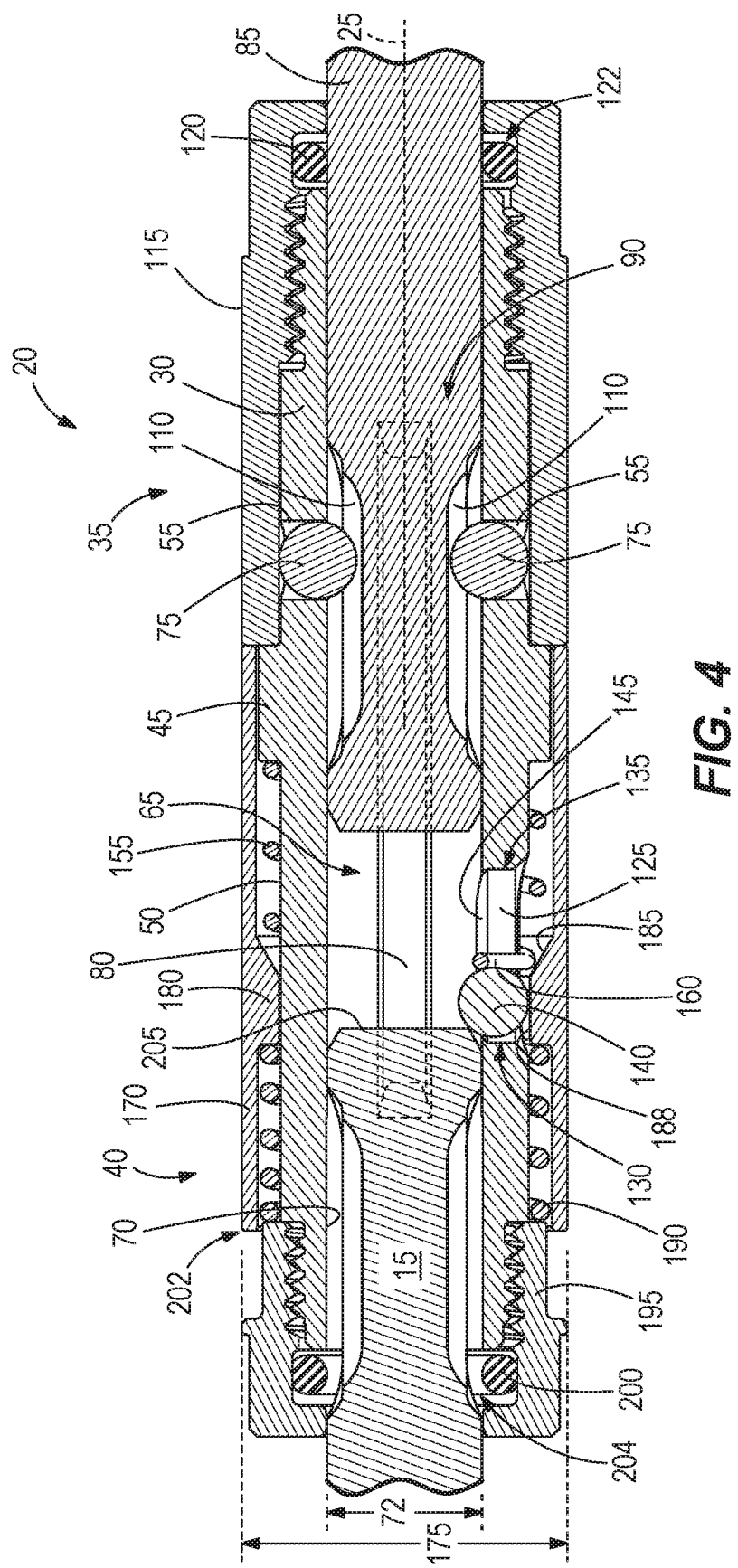
FIG. 4 is a cross-sectional view of the extension adapter taken along line 4-4 of FIG. 1 illustrating the tool bit partially inserted into the extension adapter in a first position.
Figure 5:
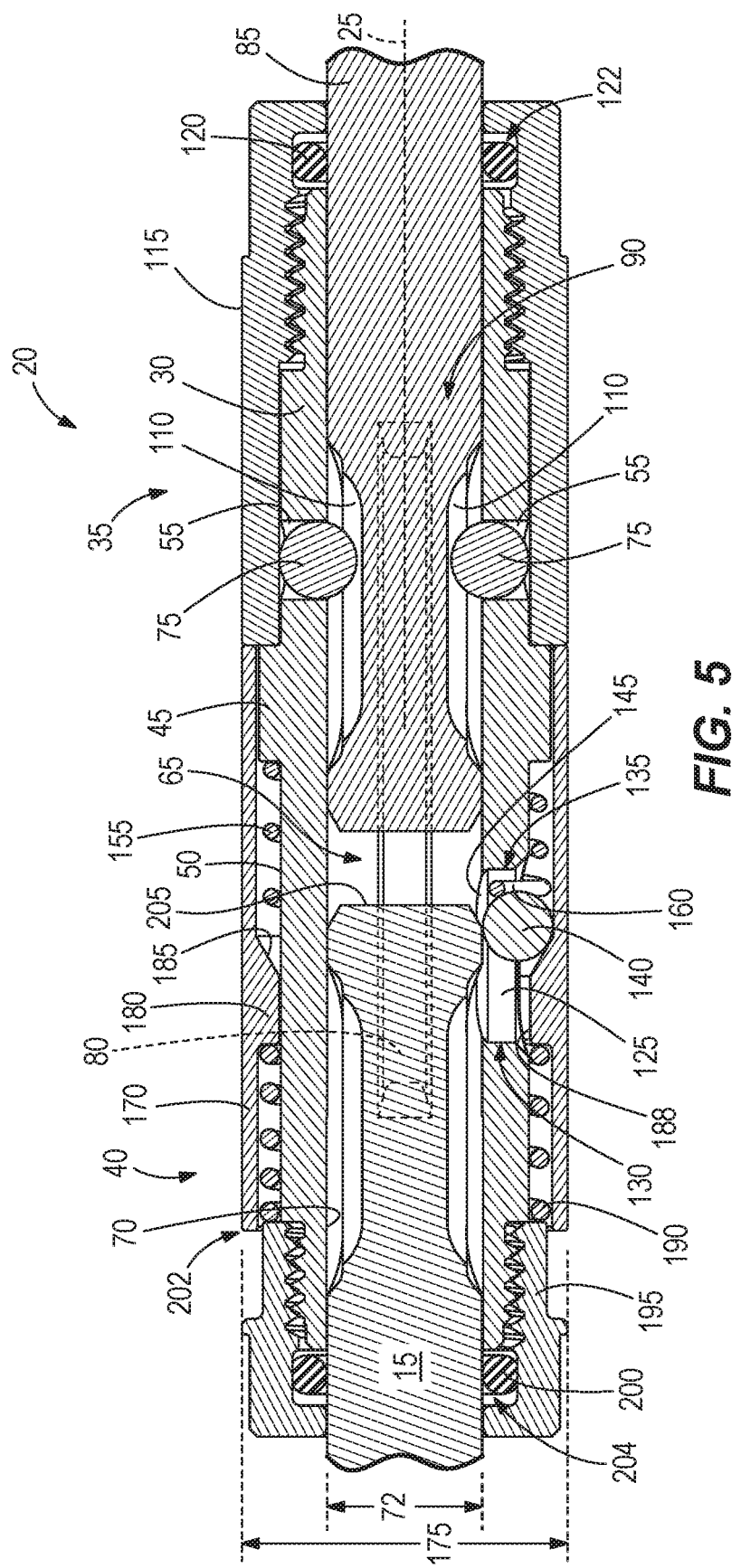
FIG. 5 is a cross-sectional view of the extension adapter taken along line 4-4 of FIG. 1 illustrating the tool bit partially inserted into the extension adapter in a second position.

With reference to FIG. 2, the adapter 20 includes a body 30 having a rear portion 35 separated from a front portion 40 by a flange 45. The flange 45 extends radially from an outer surface 50 of the body 30. The rear portion 35 of the body 30 includes two opposing cylindrical apertures 55 (only one cylindrical aperture 55 is illustrated in FIG. 2). The cylindrical apertures 55 are spaced 180 degrees from each other and are in communication with a central bore 65 of the adapter 20 defined by an inner surface 70 of the body 30. In the illustrated embodiment, the inner surface 70 defines a diameter 72 (FIGS. 4-7) of about 0.394 inches (e.g., slightly larger than a shank of the tool bit 15). In other embodiments, the diameter 72 can be greater than or less than about 0.394 inches. Each cylindrical aperture 55 is sized to receive a locking member (e.g., a ball bearing or locking sphere 75) so that a portion of each locking sphere 75 extends beyond the inner surface 70 and into the central bore 65 (FIG. 4). In other embodiments, a plug or protrusion can be received through each aperture 55 into the central bore 65 and fixed relative to the body 30.

In addition, the body 30 includes two opposing protrusions 80 (e.g., anti-rotational rails) extending beyond the inner surface 70 of the central bore 65 radially toward the rotational axis 25 (FIG. 4). The illustrated protrusions 80 also linearly extend from the rear portion 35 of the body 30 to the front portion 40 of the body 30. In the illustrated embodiment, the protrusions 80 are formed integral with the body 30 as a single component. In other embodiments, the protrusions 80 can be inserts that are coupled to the body 30 (e.g., by a press fit engagement, by a brazing process, or the like). In further embodiments, the body 30 can include more than two protrusions 80 (e.g., four protrusions) with a pair of protrusions associated with the rear portion 35 of the body 30 and the other pair of protrusions associated with the front portion 40 of the body 30.

Referring to FIGS. 1 and 2, the body 30 of the adapter 20 is coupled to the power tool 10 by an extension shank or shaft 85. The illustrated shaft 85 includes a first end portion 90 that is coupled to the body 30 and a second end portion 95 that is coupled to a chuck 100 of the power tool 10. Both end portions 90, 95 include two opposing channels 105 and two opposing grooves 110, which collectively define a SDS plus interface. To connect the shaft 85 to the body 30, the shaft 85 is positioned within the central bore 65 so that a portion of each protrusion 80 is received within one channel 105 of the first end portion 90 and each locking sphere 75 is received within one groove 110 of the first end portion 90 (FIG. 4). Such a connection between the shaft 85 and the body 30 locks the shaft 85 to the body 30 and allows the shaft 85 to axially move along the rotational axis 25, but inhibits the shaft 85 from rotating relative to the body 30. In other embodiments, the shaft 85 can be fixed to the body 30 (e.g., inhibited from axial and rotational movement relative to the body 30). Furthermore, the shaft 85 extends through a rear end cover 115 that is coupled to the rear portion 35 of the body 30 (e.g., by a threaded engagement between the rear portion 35 of the body 30 and the rear end cover 115). The rear end cover 115 extends over the two cylindrical apertures 55—and ultimately the two locking spheres 75—to trap each locking sphere 75 within the respective cylindrical aperture 55 between the respective groove 110 and the rear end cover 115 (FIG. 4). In addition, a gasket 120 is positioned within a slot 122 formed between the rear portion 35 and a portion of the rear end cover 115. The gasket 120 inhibits dust and debris from entering the adapter 20 through the central bore 65 between the shaft 85 and the rear end cover 115. The gasket 120 can be composed of an elastomeric or rubber material. The gasket 120 can be a wiper ring-type gasket, a quad ring gasket, an O-ring gasket, etc. In other embodiments, the gasket 120 can be omitted.

Figure 3:
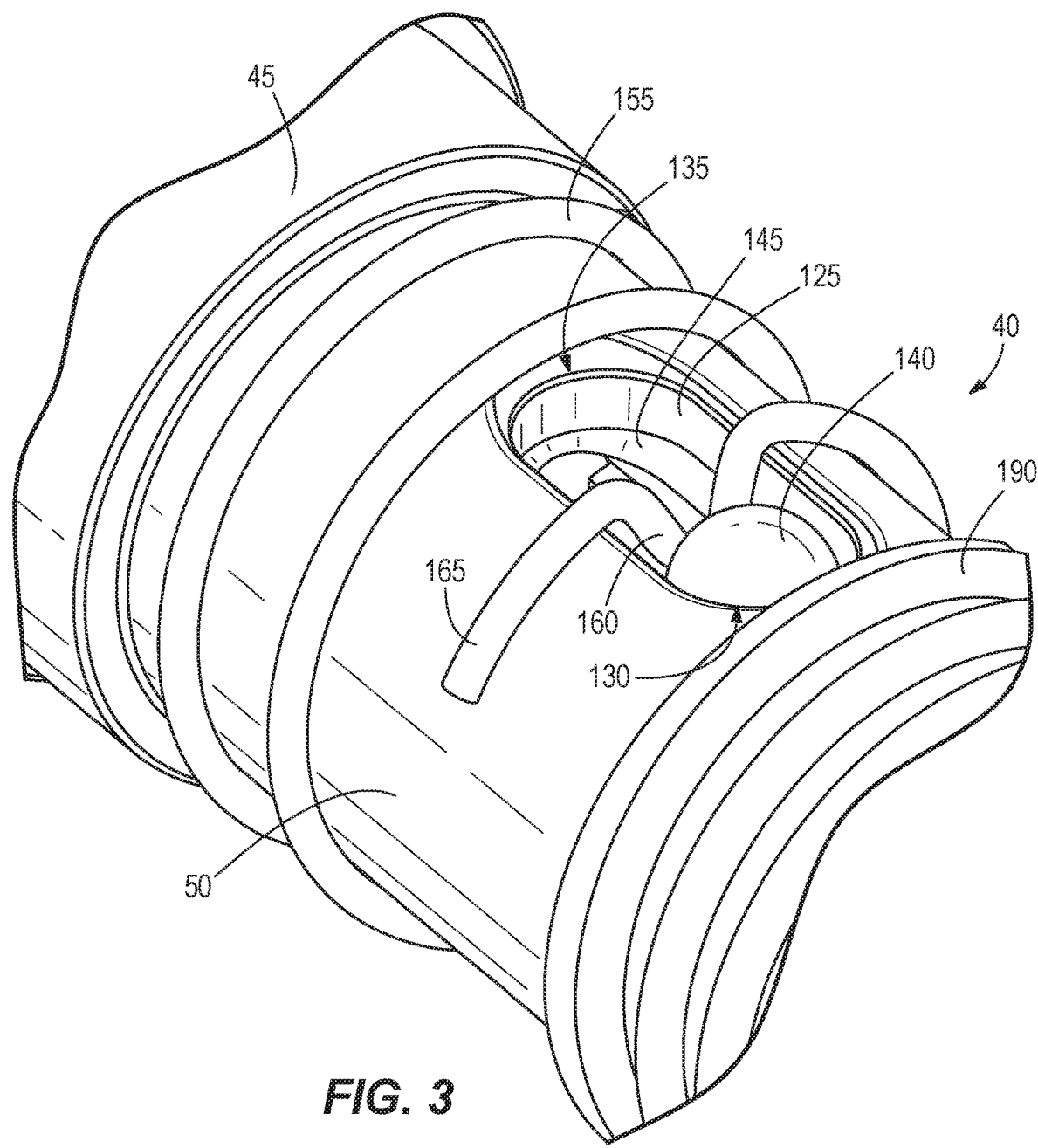
FIG. 3 is a detailed view of a portion of the extension adapter of FIG. 2.
Figure 6:
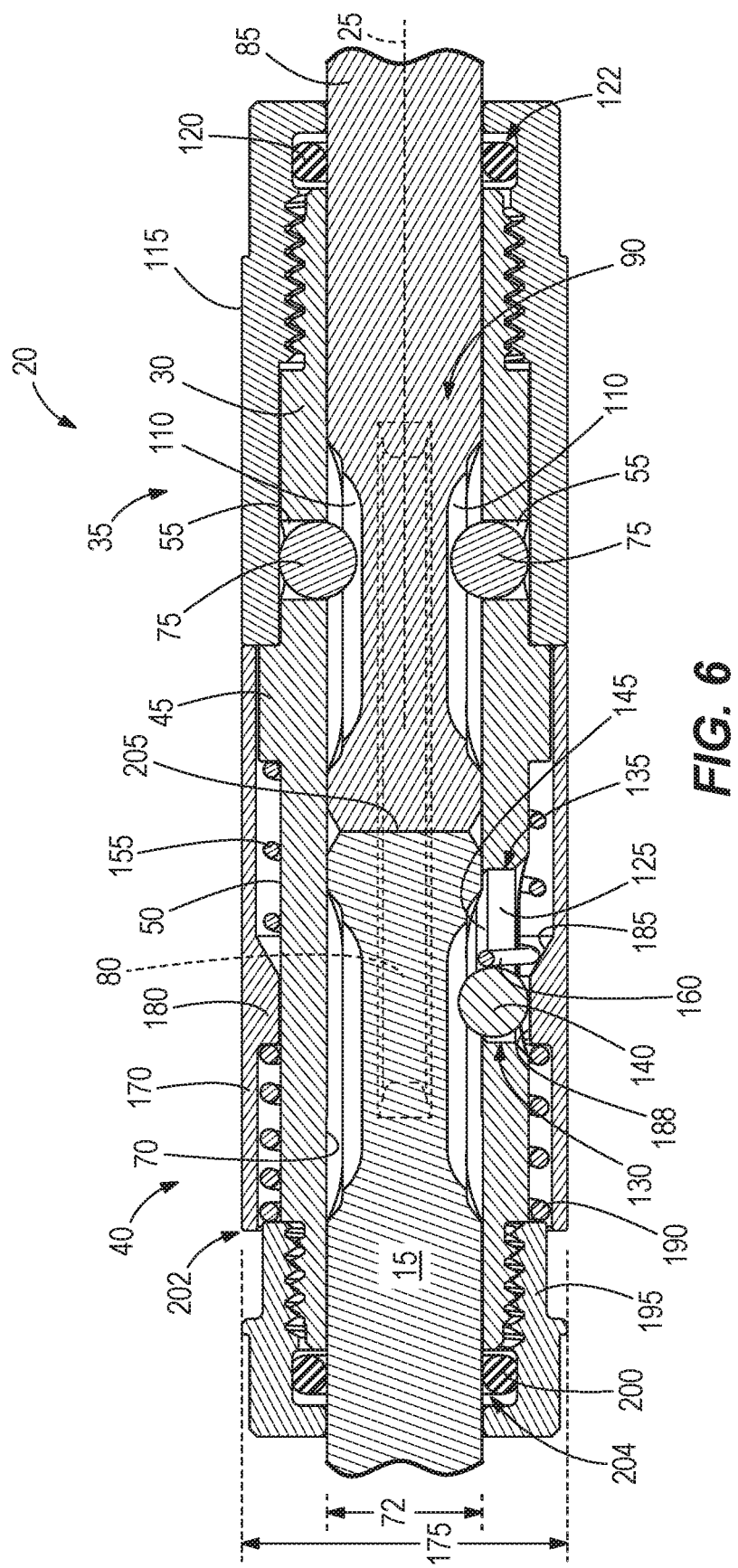
FIG. 6 is a cross-sectional view of the extension adapter taken along line 4-4 of FIG. 1 illustrating the tool bit fully inserted into the extension adapter in a locked position.

With continued reference to FIG. 2, the front portion 40 includes one elongated aperture 125 (in a direction parallel to the rotational axis 25) spaced 90 degrees relative to the protrusions 80. As shown in FIG. 3, the elongated aperture 125 includes a forward end 130 and a rearward end 135 with the rearward end 135 positioned closer to the rear portion 35 of the body 30 than the forward end 130. The elongated aperture 125 is sized to receive a retaining member (e.g., a ball bearing or retaining sphere 140). Specifically, the elongated aperture 125 includes an open floor 145 in which a portion of the retaining sphere 140 extends through to extend into the central bore 65. In the illustrated embodiment, at least about 1.5 millimeters (mm) of the retaining sphere 140 extends into the central bore 65 (FIGS. 4 and 6). In other embodiments, about 2 mm of the retaining sphere 140 extends into the central bore 65. In further embodiments, about 1.5 mm to about 2 mm of the retaining sphere 140 extends into the central bore 65. The illustrated retaining sphere 140 includes a major dimension (e.g., diameter 150; FIG. 2) of about 4.5 mm. In other embodiments, the diameter 150 of the retaining sphere 140 can be less than about 7 mm. In further embodiments, the diameter 150 of the retaining sphere 140 can be between about 4.5 mm and about 7 mm. In yet further embodiments, the diameter 150 of the retaining sphere 140 can be less than 4.5 mm.

As best shown in FIGS. 2 and 3, a first biasing member (e.g., a first compression coil spring 155) surrounds the front portion 40 of the body 30 with one side of the first spring 155 contacting the flange 45 and the other side of the first spring 155 having a radially inward extending protrusion 160. The protrusion 160 is sized to be received within the elongated aperture 125 to engage the retaining sphere 140 and bias the retaining sphere 140 toward the forward end 130 of the elongated aperture 125 (e.g., away from the shaft 85). The illustrated protrusion 160 is a U-shaped protrusion formed away from one end 165 of the first spring 155. In another embodiment, the end 165 of the first spring 155 can form at least a portion of the protrusion 160. In further embodiments, the protrusion 160 can be a loop or a V-shaped protrusion.

As best shown in FIGS. 2 and 4, the adapter 20 also includes a collar 170 slidably coupled to the front portion 40 of the body 30. The illustrated collar 170 includes an outer diameter 175 of about 0.827 inches, which is substantially the same as an outer diameter of the rear end cover 115. As such, a ratio of the outer diameter 175 over the diameter 72 of the central bore 65 is about 2.1. In other embodiments, the outer diameter 175 is less than about 0.875 inches so that a ratio of the outer diameter 175 over the diameter 72 of the central bore 65 is less than about 2.1. In further embodiments, the outer diameter 175 is less than about 0.75 inches so that a ratio of the outer diameter 175 over the diameter 72 of the central bore 65 is less than about 1.9. Stated another way, a maximum width of the adapter 20 is less than about 0.875 inches or less than about 0.75 inches. In addition, a ratio of the maximum width of the adapter 20 (e.g., the outer diameter 175) over the major dimension 150 of the retaining member 140 (both measured in inches) is about 4.7. In other embodiments, the ratio of the maximum width of the adapter 20 over the major dimension 150 of the retaining member 140 can be less than 4.7.

As shown in FIG. 4, the illustrated collar 170 includes a step 180 extending around an inner surface of the collar 170 with the step 180 including an obliquely angled surface 185 (relative to the rotational axis 25) and an inner surface 188. The angled surface 185 generally faces toward the rear portion 35 of the body 30. The illustrated first spring 155 is positioned between the flange 45 and the step 180. In addition, a second biasing member (e.g., a second compression coil spring 190) is positioned between the step 180 and a front end cover 195. The front end cover 195 is coupled to the front portion 40 of the body 30 (e.g., by a threaded engagement between the front portion 40 of the body 30 and the front end cover 195). The second spring 190 engages the step 180 to bias the collar 170 away from the front end cover 195 (e.g., toward the shaft 85).

With continued reference to FIG. 4, the adapter 20 includes a gasket 200 positioned within a slot 204 formed between the front portion 40 and a portion of the front end cover 195. The gasket 200 inhibits dust and debris from entering the adapter 20 through the central bore 65 when the tool bit 15 is coupled to the adapter 20 (FIG. 6). The gasket 200 can be composed of an elastomeric or rubber material. The gasket 200 can be a wiper ring-type gasket, a quad ring gasket, an O-ring gasket, etc. In other embodiments, the gasket 200 can be omitted.

In some embodiments, a dust cover or shield can be coupled to an outer surface of the front end cover 195 to divert dust and debris away from a front interface (e.g., a gap 202) between the front end cover 195 and the collar 170. As such, dust and debris are inhibited from entering into the adapter 20 through the gap 202 between the collar 170 and the front portion 40 of the body 30. The dust cover can include an outer diameter that is equal to or smaller than the maximum outer diameter of the adapter 20. In other embodiments, the front end cover 195 and the dust cover can be formed as a single integral component.

In the illustrated embodiment, the tool bit 15 is coupled to the adapter 20 without the use of a tool, and the tool bit 15 can be automatically locked to the adapter 20 without moving the collar 170 relative to the body 30. With reference to FIG. 4, to couple the tool bit 15 to the adapter 20, the tool bit 15 is inserted into the central bore 65 through the front end cover 195 and the gasket 200 so that a portion of the protrusions 80 are received within channels of the tool bit 15 (similar to the channels 105 of the shaft 85). With further movement of the tool bit 15 toward the shaft 85, a rear surface 205 of the tool bit 15 contacts the retaining sphere 140, and the tool bit 15 pushes the retaining sphere 140 off of the inner surface 188 of the step 180 toward the rearward end 135 of the elongated aperture 125 against the biasing force of the first spring 155. In one embodiment, the retaining sphere 140 can then slide along the angled surface 185 of the step 180 toward the rearward end 135. Once the tool bit 15 pushes the retaining sphere 140 into engagement with the rearward end 135, the retaining sphere 140 then moves radially toward the collar 170 to provide enough clearance between the tool bit 15 and the retaining sphere 140 for the tool bit 15 to be fully inserted into the central bore 65. For example, the tool bit 15 pushes the retaining sphere 140 radially outward so that no portion of the retaining sphere 140 extends into the central bore 65, thereby allowing the tool bit 15 to be fully inserted into the central bore 65. The first spring 155 then pushes the retaining sphere 140 against the angled surface 185 for the retaining sphere 140 to slide radially inward into the central bore 65 to be received into a groove of the tool bit 15 (similar to the groove 110 of the shaft 85). Accordingly, the retaining sphere 140 retains the tool bit 15 within the adapter 20 (FIG. 6), but allows for some axial movement of the tool bit 15 along the rotational axis 25.

Once the tool bit 15 is coupled to the adapter 20 and the adapter 20 is coupled to the power tool 10, the power tool 10 is operable to drive the tool bit 15 into a workpiece (e.g., concrete, brick, or the like) to form a hole. During the drill operation, the tool bit 15 and the adapter 20 can move into the hole being formed in the workpiece if the diameter of the tool bit 15 is greater than the maximum width of the adapter 20 (e.g., greater than 0.875 inches). Advantageously, a tool bit 15 having a diameter greater than the outer diameter 175 of the adapter 20 (e.g., 0.875 inches) can be used to bore holes in a workpiece to various lengths that are greater than the length of the tool bit 15 itself. For example, a 6 inch long tool bit 15 having a diameter of at least 0.875 inches can be used to bore a hole that is longer than 6 inches by using the adapter 20.

Figure 7:
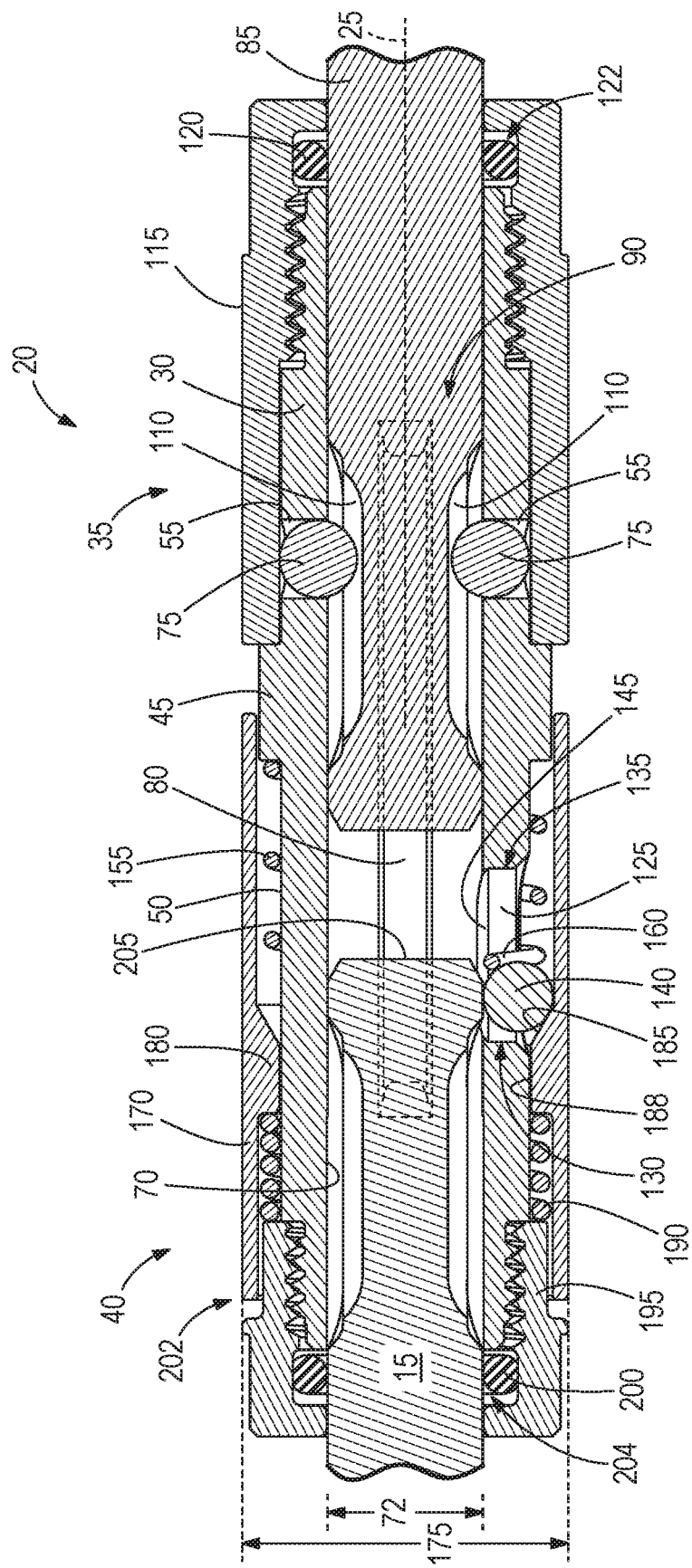
FIG. 7 is a cross-sectional view of the extension adapter taken along line 4-4 of FIG. 1 illustrating the extension adapter in an unlocked position allowing the tool bit to be removed from the extension adapter.

After the drilling operation is completed and the tool bit 15 is removed from the workpiece, the tool bit 15 can be removed from the adapter 20 by moving the collar 170 toward the front end cover 195 (FIG. 7). As a result, the step 180 moves in a position between the elongated aperture 125 and the front end cover 195 to allow the retaining sphere 140 to move radially out of the central bore 65 as the tool bit 15 slides out of the adapter 20. By releasing the collar 170, the second spring 190 automatically biases the collar 170 toward the shaft 85 to position the step 180 over the elongated aperture 125 as the retaining sphere 140 slides along the angled surface 185 into engagement with the inner surface 188 of the step 180. In other embodiments, the collar 170 can move toward the rear end cover 115 to release the tool bit 15 from the adapter 20.

FIGS. 8-11 illustrate an adapter 320 (FIG. 8) according to another embodiment of the disclosure. The adapter 320 is similar to the adapter 20; therefore, like components have been given like references numbers plus 300. At least some differences and/or at least some similarities between the adapters 20, 320 will be discussed in detail below. In addition, components or features described with respect to the adapter 320 are equally applicable to the adapter 20.

Figure 8:
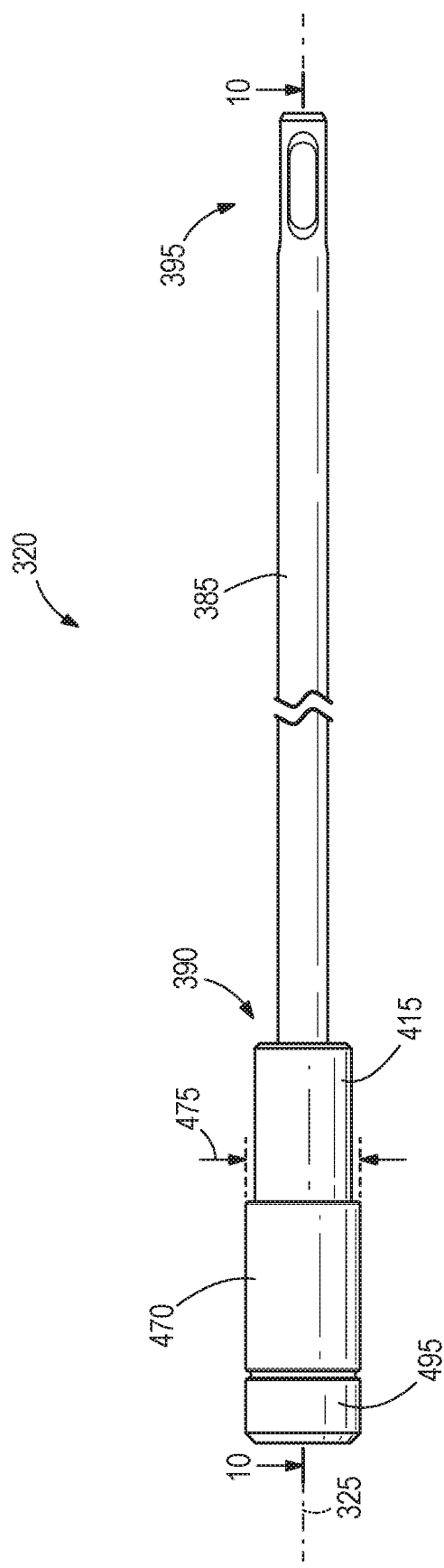
FIG. 8 is a side view of an extension adapter according to another embodiment.
Figure 9:
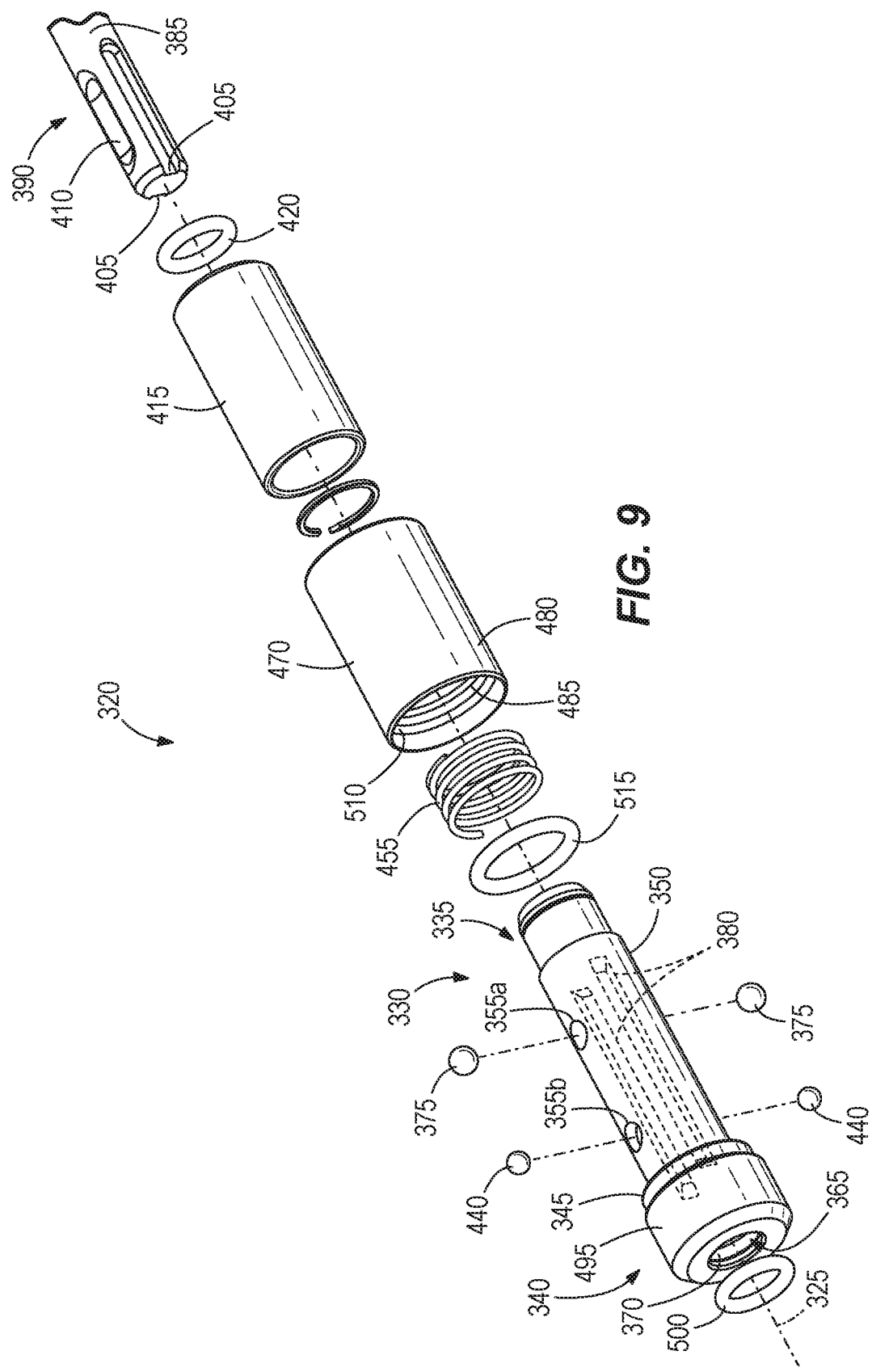
FIG. 9 is an exploded view of the extension adapter of FIG. 8.

With reference to FIGS. 8 and 9, the adapter 320 includes a body 330 having an inner surface 370 defining a central bore 365 having a diameter 372. The body 330 also includes an outer surface 350 and a rear portion 335 separated from a front portion 340 by a flange 345. The adapter 320 defines a rotational axis 325. In the illustrated embodiment, the rear portion 335 is longer than the front portion 340, and the front portion 340 includes a larger diameter than the flange 345 and the rear portion 335. The rear portion 335 includes a first pair of opposing cylindrical apertures 355a (only one cylindrical aperture 355a is illustrated in FIG. 9) and also includes a second pair of opposing cylindrical apertures 355b (only one cylindrical aperture 355b is illustrated in FIG. 9). Each cylindrical aperture 355a is sized to receive a locking member (e.g., a locking sphere 375).

Figure 10:
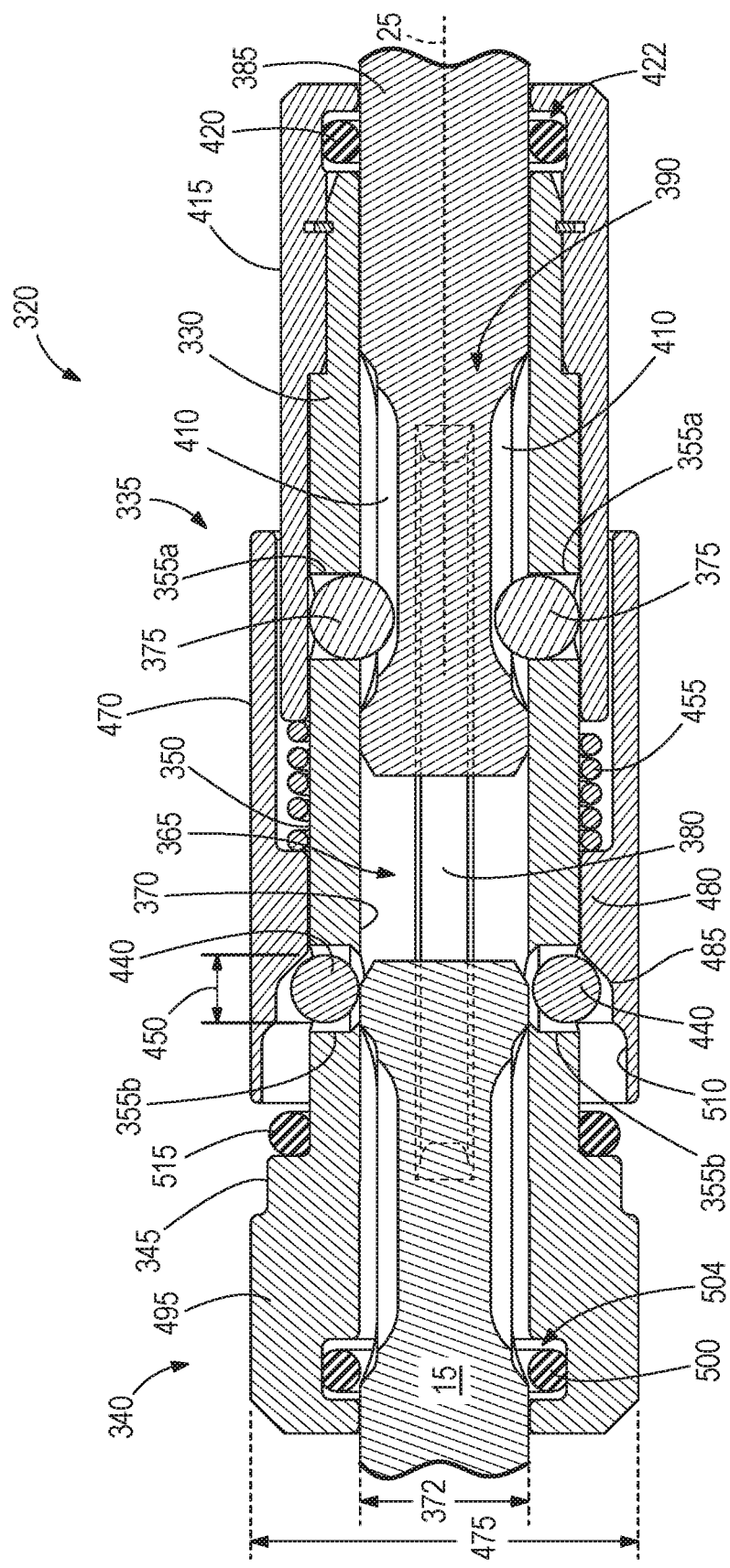
FIG. 10 is a cross-sectional view of the extension adapter taken along line 10-10 of FIG. 8 illustrating the extension adapter in an unlocked position with the tool bit partially inserted into the extension adapter.
Figure 11:
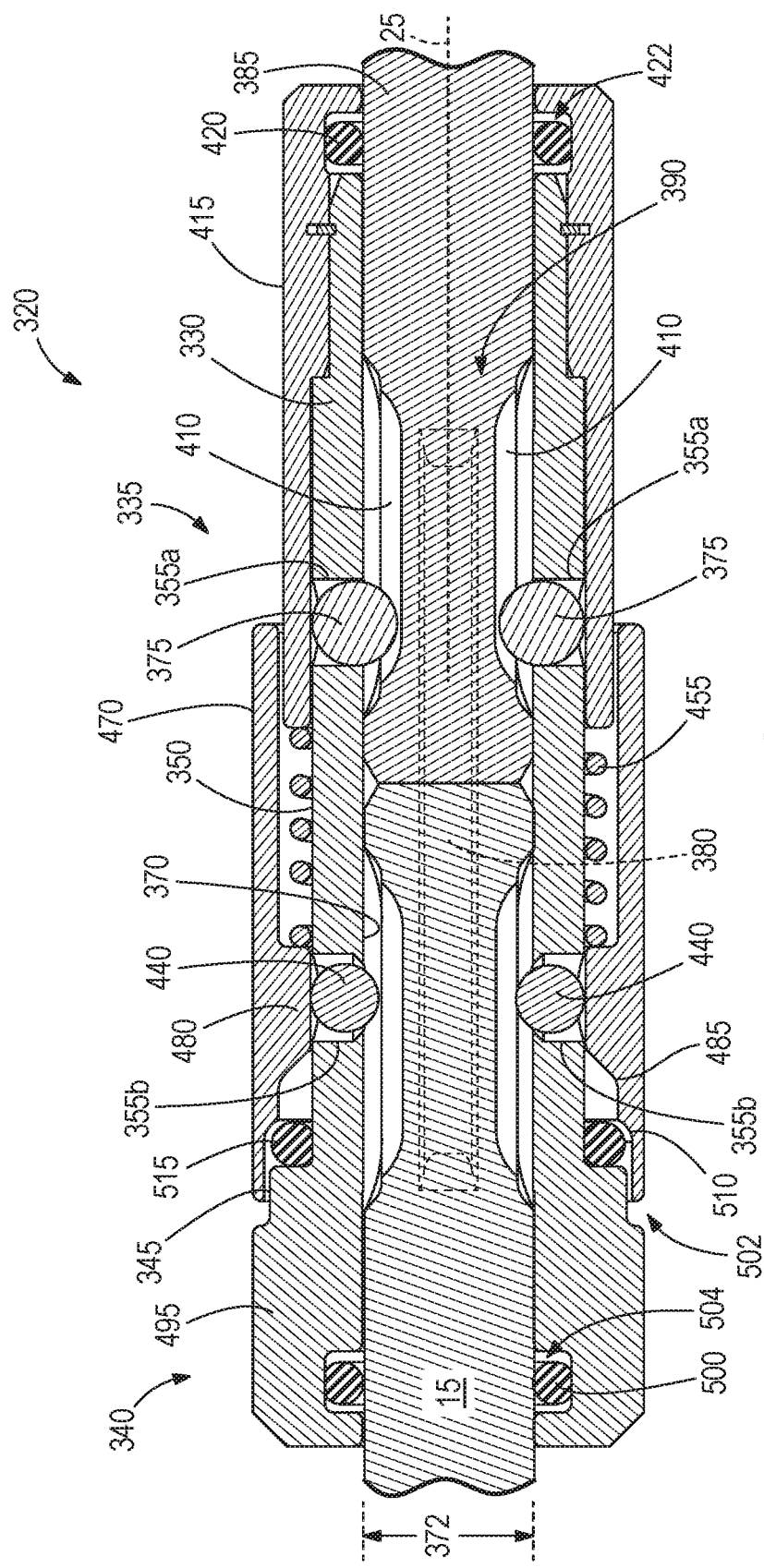
FIG. 11 is a cross-sectional view of the extension adapter taken along line 10-10 of FIG. 8 illustrating the extension adapter in a locked position with the tool bit fully inserted into the extension adapter.

With continued reference to FIGS. 8 and 9, the adapter 320 also includes an extension shank or shaft 385. The illustrated shaft 385 includes a first end portion 390 coupled to the body 330 and a second end portion 395 coupled to the chuck 100 of the power tool 10. Both end portions 390, 395 include two opposing channels 405 and two opposing grooves 410 (e.g., a SDS plus interface). A rear end cover 415 is coupled to the rear portion 335 of the body 330 (e.g., by a retaining ring) to extend over the two cylindrical apertures 355a. As such, each locking sphere 375 is trapped within the respective cylindrical aperture 355a between the respective groove 410 and the rear end cover 415 (FIG. 10). Such a connection between the shaft 385 and the body 330 allows the shaft 385 to axially move along the rotational axis 325, but inhibits the shaft 385 from rotating relative to the body 330. In addition, a gasket 420 is positioned within a slot 422 formed between the rear portion 335 and a portion of the rear end cover 415.

With reference to FIGS. 9 and 10, each of the second cylindrical apertures 355b is sized to receive a retaining member (e.g., a retaining sphere 440). The illustrated retaining spheres 440 include a major dimension (e.g., a diameter 450) of about 5 mm. In other embodiments, the diameter 450 of the retaining sphere 440 can be less than about 7 mm. In further embodiments, the diameter 450 of the retaining sphere 440 can be between about 5 mm and about 7 mm. In further embodiments, the diameter 450 can be less than 5 mm.

With continued reference to FIGS. 9 and 10, the adapter 320 also includes a collar 470 slidably coupled to the rear portion 335 of the body 330. The illustrated collar 470 includes an outer diameter 475 of about 0.905 inches, which defines the largest diameter or width of the adapter 320. As such, a ratio of the outer diameter 475 over the diameter 372 of the central bore 365 is about 2.3. In other embodiments, the outer diameter 475 of the adapter 320 is less than about 1 inch so that a ratio of the outer diameter 475 over the diameter 372 of the central bore 365 is less than about 2.5. In addition, a ratio of the maximum width of the adapter 320 (e.g., the outer diameter 475) over the major dimension 450 of the retaining member 440 (both measured in inches) is about 4.6. In other embodiments, the ratio of the maximum width of the adapter 320 over the major dimension 450 of the retaining member 440 can be less than 4.6.

The illustrated collar 470 includes a step 480 having an obliquely angled surface 485 and a recess 510 positioned adjacent a front end of the collar 470. A biasing member (e.g., a compression coil spring 455) is positioned between the rear end cover 415 and the step 480 to bias the collar 470 toward the flange 345 and a front end cover 495. The front end cover 495 is fixed to the front portion 340 of the body 330 and includes substantially the same diameter as the collar 470. In other embodiments, the diameter of the front portion 340 and the collar 470 can be different.

With reference to FIGS. 9 and 10, the adapter 320 includes a first gasket 500 positioned within a slot 504 formed by the front portion 340 of the body 330. The adapter 320 also includes a second gasket 515 (e.g., an O-ring, a quad-ring, etc.) coupled to the rear portion 335 of the body 330 and abutting the flange 345. The second gasket 515 also inhibits dust and debris from entering into the adapter 320 via the gap 502 when the adapter 320 is in the locked position (FIG. 11), discussed in more detail below.

FIG. 10 illustrates the adapter 320 in an unlocked position. In particular, the collar 470 is moved toward the rear end cover 415 against the biasing force of the spring 455 so that the step 480 misaligns with the pair of cylindrical apertures 355b. As a result, the retaining spheres 440 are allowed to move radially away from the central bore 365 and toward an inner surface of the collar 470 (e.g., a portion of the retaining spheres 440 extend beyond the outer surface 350 of the body 330). However, rearward movement of the collar 470 toward the rear end cover 415 is limited to prevent the retaining spheres 440 from falling out of the cylindrical apertures 355b. For example, a gap between a front end of the collar 470 and the cylindrical apertures 355b is smaller than the diameter of the retaining spheres 440 so that the retaining spheres 440 cannot fall out of the adapter 320 through the gap when the collar 470 is in the unlocked position. When the adapter 320 is in the unlocked position, the tool bit 15 can be slid into the central bore 365 for portions of the two protrusions 80 to be received within the channels of the tool bit 15 (similar to the channels 405 of the shaft 385). With further movement of the tool bit 15 toward the shaft 385, the retaining spheres 440 align with a corresponding groove of the tool bit 15 (similar to the groove 410 of the shaft 385). Thereafter, the collar 470 is released for the spring 455 to move the collar 470 into a locked position (FIG. 11) to lock the tool bit 15 to the adapter 320. In particular, the angled surface 485 comes into contact with the retaining spheres 440 to push the retaining spheres 440 radially toward the central bore 365 within the cylindrical apertures 355. Accordingly, a portion of the retaining spheres 440 extend beyond the inner surface 370 of the body 330 to inhibit removal of the tool bit 15 from the adapter 320. In addition, the spring 455 moves the collar 470 into the second gasket 515 to compress the second gasket 515 between the flange 345 and the recess 510 to inhibit dust and debris from entering into the adapter 320 via the gap 502.

During a drill operation, the adapter 320 is sized to be received within a hole being formed by the tool bit 15. As such, for any tool bit 15 having a diameter greater than about 0.905 inches (e.g., the maximum diameter of the adapter 320), the adapter 320 can be received within the hole formed by the tool bit 15.

After the drilling operation, the tool bit 15 can be removed from the adapter 320 by moving the collar 470 toward the rear end cover 415 to move the adapter 320 from the locked position (FIG. 11) to the unlocked position (FIG. 10). As the tool bit 15 slides out of the central bore 365, the tool bit 15 contacts the retaining spheres 440 to push the retaining spheres 440 radially toward the collar 470 to provide enough clearance for the tool bit 15 to be removed out of the adapter 320.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. An extension adapter configured to couple a tool bit to a power tool, the power tool configured to drive the extension adapter and the tool bit about a rotational axis, the extension adapter comprising:
 a body including a bore, the bore configured to receive the tool bit;
 a retaining member received within an aperture of the body;
 a front end cover coupled to the body;
 a gasket captured between the front end cover and the body and configured to contact the tool bit, the gasket configured to block debris from entering the body;
 a spring surrounding a portion of the body, the spring including a first end wrapped around an outer surface of the body adjacent the aperture, a second end opposite the first end and located further than the first end from the aperture, and a protrusion formed away from the first end, the protrusion being received within the aperture to bias the retaining member into a first position in which a portion of the retaining member extends into the bore; and a collar moveable between an unlocked position and a locked position, the unlocked position configured to allow the tool bit to be removed from the bore;

wherein, while the collar is maintained in the locked position, the body is configured to slidably receive the tool bit such that the portion of the retaining member is received in a groove of the tool bit to secure the tool bit to the body.

2. The extension adapter of claim 1, wherein the collar includes an inwardly protruding step, wherein the retaining member is seated on an inner surface of the inwardly protruding step when in the first position, and wherein the body is configured to slidably receive the tool bit such that the tool bit contacts the retaining member and pushes the retaining member of the inner surface into a second position before the portion of the retaining member is received in the groove of the tool bit.

3. The extension adapter of claim 2, further comprising a biasing member contacting the inwardly protruding step to bias the collar into the locked position.

4. The extension adapter of claim 2, wherein the body is configured to slidably receive the tool bit such that the retaining member slides along a ramp surface of the inwardly protruding step onto the inner surface to be received in the groove of the tool bit after the retaining member is moved into the second position.

5. The extension adapter of claim 1, wherein the body is configured to allow movement of the tool bit in a direction along the rotational axis when the tool bit is secured to the body.

6. The extension adapter of claim 1, further comprising an extension shaft coupled to the body such that the extension shaft is moveable in a direction along the rotational axis, wherein the extension shaft is configured to be selectively coupled to a chuck of the power tool.

7. The extension adapter of claim 6, further comprising a rear end cover coupled to the body, wherein a gasket is captured between the rear end cover and the body to contact the extension shaft, and wherein the gasket is configured to block debris from entering the body.

8. The extension adapter of claim 1, wherein the bore is defined by an inner surface of the body having a first diameter, wherein the collar includes a maximum outer diameter, and wherein a ratio of the maximum outer diameter of the collar over the first diameter of the body is less than 2.5.

* * * * *